United States Patent [19]

Horn et al.

[11] Patent Number: 5,276,676
[45] Date of Patent: Jan. 4, 1994

[54] METHOD FOR MONITORING A BIT RATE OF AT LEAST ONE VIRTUAL CONNECTION

[75] Inventors: Michael Horn, Munich; Christian Hinterberger, Holzkirchen; Hans-Peter Huth, Munich, all of Fed. Rep. of Germany

[73] Assignee: Siemens Aktiengesellschaft, Munich, Fed. Rep. of Germany

[21] Appl. No.: 783,786

[22] Filed: Oct. 29, 1991

[30] Foreign Application Priority Data

Oct. 29, 1990 [EP] European Pat. Off. ......... 90120746.4

[51] Int. Cl.⁵ .......................... H04J 1/16; H04J 3/14
[52] U.S. Cl. ...................................... 370/17; 370/60; 370/60.1
[58] Field of Search .................... 370/60, 60.1, 84, 17, 370/13, 110.1, 94.1, 94.2, 85.6

[56] References Cited

U.S. PATENT DOCUMENTS

| 4,896,316 | 6/1990 | Lespagnol et al. | 370/60 |
| 5,115,429 | 5/1992 | Hluchyj et al. | 370/84 |
| 5,117,417 | 5/1992 | Danner | 370/84 |
| 5,119,364 | 6/1992 | Thiebaut et al. | 370/94.1 |
| 5,128,932 | 7/1992 | Li | 370/60 |
| 5,132,961 | 6/1992 | Thiebaut et al. | 370/94.1 |
| 5,132,966 | 6/1992 | Hayano et al. | 370/94.1 |
| 5,138,607 | 8/1992 | Thiebaut et al. | 370/94.1 |

FOREIGN PATENT DOCUMENTS

| 0310173 | 4/1989 | European Pat. Off. . | |
| 0366635 | 5/1990 | European Pat. Off. . | |
| 0381275 | 8/1990 | European Pat. Off. . | |
| 9005416 | 5/1990 | World Int. Prop. O. | 370/17 |

OTHER PUBLICATIONS

"The Policing Function to Control User Access in ATM Networks—Definition and Implementation" by W. Kowalk, Conference Report of Iss IS 88, Boston 1988, Chapter 12.2, IEEE, pp. 240-245.

Primary Examiner—Douglas W. Olms
Assistant Examiner—Chau T. Nguyen
Attorney, Agent, or Firm—Hill, Steadman & Simpson

[57] ABSTRACT

A method for monitoring at least one bit rate of at least one virtual connection, of a plurality of virtual connections, for which connection cells incoming on a transmission link are checked with respect to their temporal frequency. A temporal, average cell spacing of the incoming connection cells is provided according to an average bit rate of the at least one virtual connection and a bit rate on the transmission link. A central counter is clocked by a central counting clock and a counter value of the central counter is read at each of the incoming connection cells and the counter value that is connection-associated with the at least one virtual connection is stored. A counter value difference is formed from the stored counter value for the incoming connection cell and from the counter value that has been previously stored connection-associated with the at least one virtual connection for a previously arrived connection cell of the same virtual connection. A deviation is calculated of a respectively current cell spacing from the prescribed, average cell spacing for the respectively incoming connection cell using the counter value difference. A monitoring counter value is formed by summing the deviation of the cell spacing. A special handling of the virtual connection is implemented when the monitoring counter value transgress a first threshold value.

17 Claims, 6 Drawing Sheets

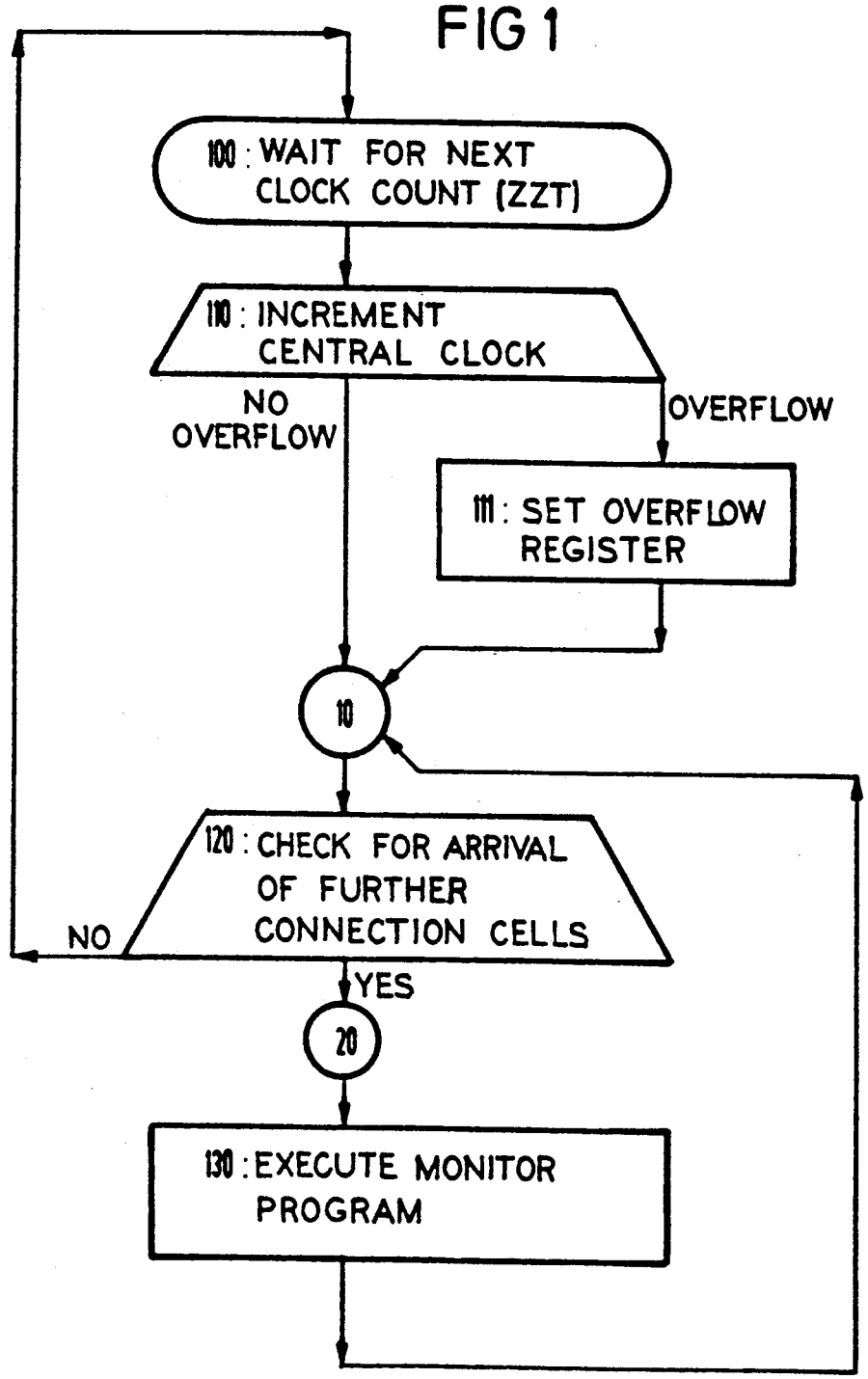

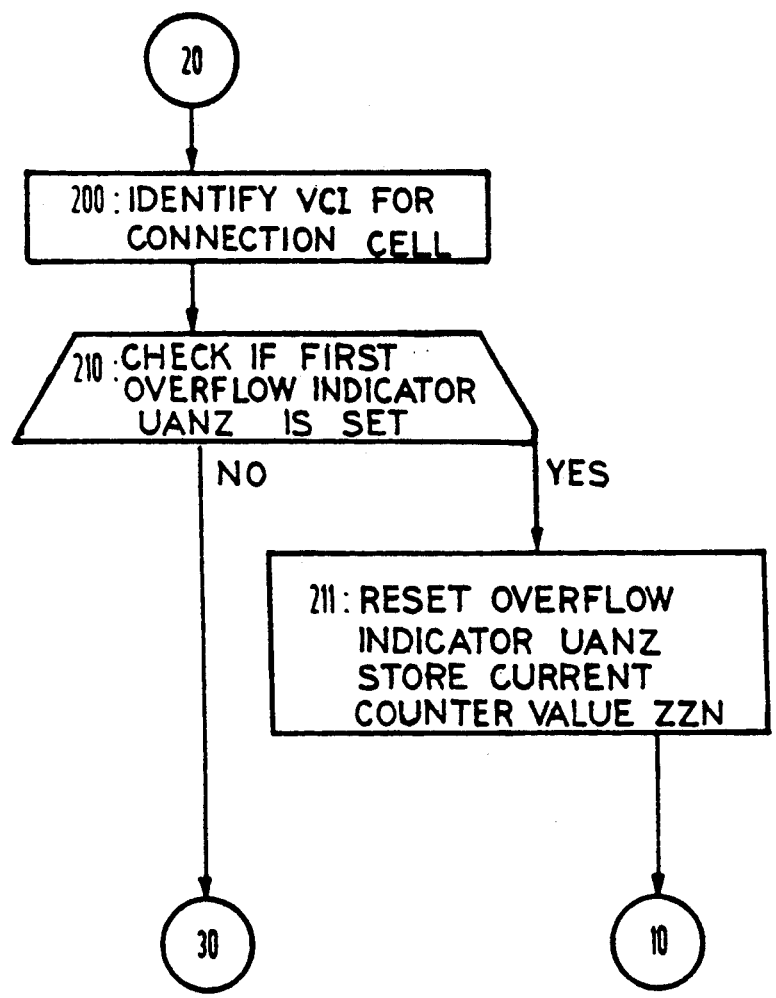

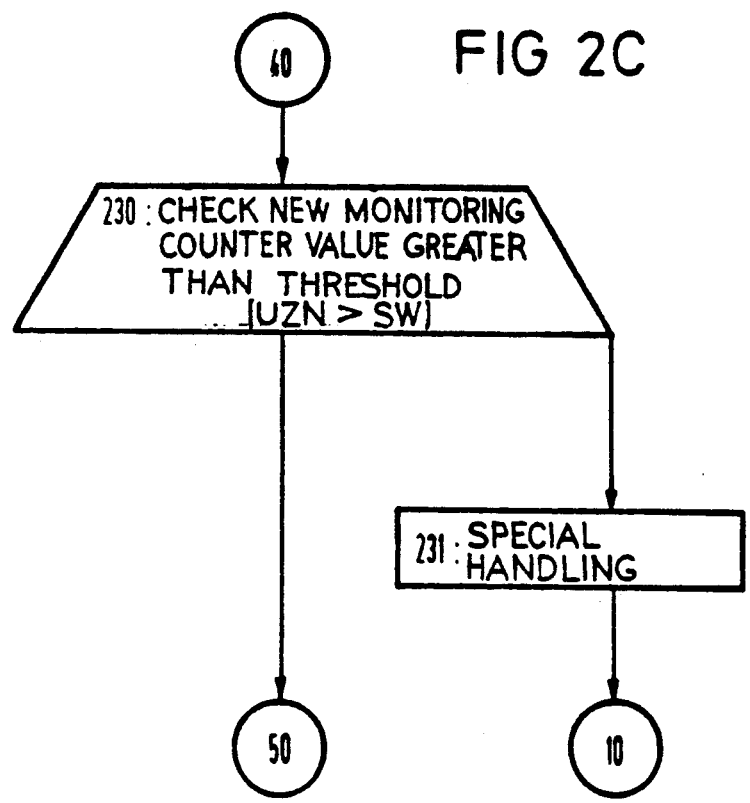
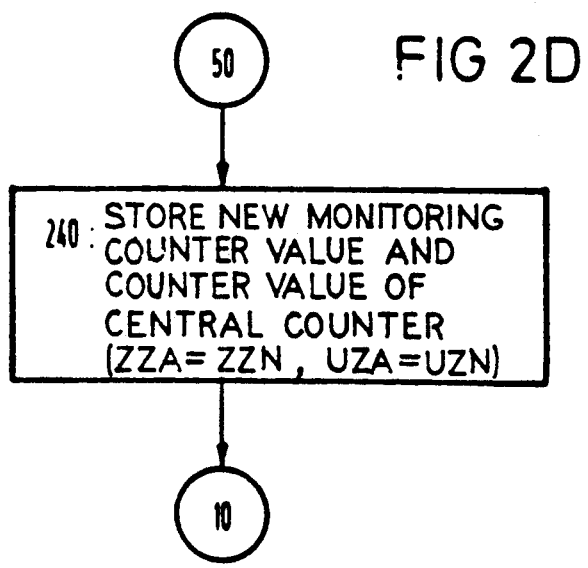

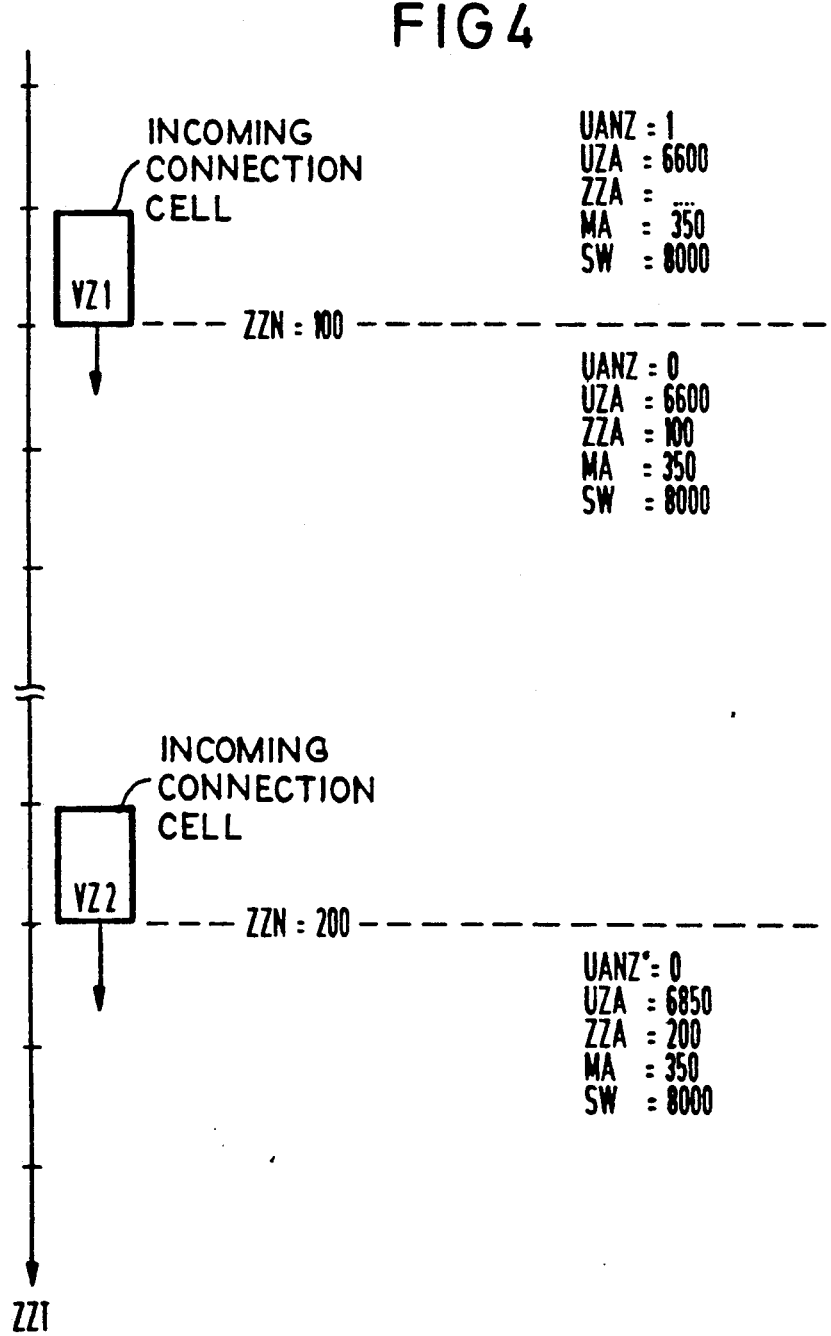

METHOD FOR MONITORING A BIT RATE OF AT LEAST ONE VIRTUAL CONNECTION

BACKGROUND OF THE INVENTION

The present invention is directed to a method for monitoring at least one bit rate of at least one virtual connection whose connection cells incoming on a transmission link are checked with respect to their chronological frequency.

In, for example, a broad band transmission network for which, for example, an asynchronous transfer mode (ATM) is provided, the information to be transmitted can be transmitted in connection cells having a fixed length. As a performance feature of such a ATM network, virtual connections having call-associated bit rates should be capable of being established. A subscriber in this network has the possibility of selecting a suitable bit rate for his use, for example on the basis of a defined service category. Various characteristics can be provided for service categories in the ATM network, for example a medium bit rate, a peak bit rate, a burst length. The medium bit rate is the data rate averaged over a duration of the connection. The peak bit rate is the data rate averaged over a short time interval. A burst of the data rate of a connection occurs when the medium bit rate is briefly exceeded by rate that is a multiple of the medium bit rate. Frequently occurring bursts and, more importantly, long bursts can lead to problems in the switching nodes, for example buffer overflows. A limitation of burst lengths should therefore be provided. Bursts predominantly occur for connections involving data processing and the applications thereof, and often exceed ten times a medium bit rate.

By contrast thereto, normal telephone traffic generates a continuous, i.e. burst-free, data stream that continuously exhibits its maximum bit rate of, for example, 64 k bits/sec, predominantly while a person is speaking. The characteristics of service categories, for example a calculation of a call fee, should take the possible applications into consideration.

Data streams from connection cells of many subscribers are concentrated on common transmission lines in a transmission network. A misbehavior of a subscriber due to bursts in one of these connections can thus also negatively influence other connections. In order to avoid this, the bit rate reported by the subscriber should already be monitored in a connection-associated fashion when accessing the network, i.e., for example, before what is the first switching matrix network for this connection. This should occur with a monitoring according to what is referred to as a policing function.

Many virtual connections having different bit rates should be capable of being simultaneously active on a central office line. Each of the virtual connections on the central office line is assigned a number for identification, referred to as a virtual channel identifier (VCI). Several hundred VCIs must be often individually monitored given a connection of a private branch exchange or of a local network, referred to as local area network (LAN). A policing function having such performance demands has not been realized in the prior art.

A known method for monitoring individual, virtual connections works according to what is referred to as the "leaky bucket" principle. This principle, for example, is described in the Conference Report of iss Is 88, Boston, 1988, Chapter 12.2, (IEEE), in the article "The Policing Function to Control User Access in ATM Networks, Definition and Implementation" by W. Kowalk and R. Lehnert. This enables the monitoring of an established bit rate and of an established burst length. A counter, a threshold, a decrementation value as well as a decrementation clock are provided in connection associated fashion for each of the connections to be monitored. A counter value of the connection associated counter is decremented by the connection-associated decrementing value at periodic time intervals corresponding to the length of the connection-associated decrementation clock. This counter value is set to zero when negative values are reached. This connection-associated counter value is incremented each time a connection cell arrives for the monitored connection associated with this counter value. As soon as this counter value exceeds the connection-associated threshold, special handling for this connection is implemented. The virtual connection can be aborted in this special handling. Instead, a suppression of one or more connection cells can also occur, so that thereafter the connection, as in the case of a brief interruption, can again continue to exist after this reduction of its bit rate. Further, this connection can also continue to exist interruption-free in this special handling. The monitoring of the connection is modified by selecting the connection-associated parameters. The selected, medium bit rate is thus particularly monitored by the decrementation value and the decrementation clock. The maximum burst length is limited by the threshold. These parameters can be different for each of the connections. A respective connection-associated counter is required for each VCI and the connection-associated parameters should be stored connection-associated. For an identical clock for all connections, the decrementation clock can also be globally stored. Since all connection-associated counters must be processed within the respective decrementation clock, only a small number of monitorable connections is possible. As an inadequate method, a plurality of connections can be monitored in common in that their bit rates are monitored as an aggregate. For an upper transgression of the summed-up thresholds, however, a distinction as to which of the subscribers has exceeded his threshold cannot be made.

SUMMARY OF THE INVENTION

It is an object of the present invention to provide a method for monitoring at least one bit rate of at least one virtual connection whose connection cells incoming on a transmission link are checked with respect to their chronological frequency, so that this method can be utilized for a great plurality of connections to be monitored as well as for a great plurality of connections having different bit rates.

It is to be understood that the term "connection-associated" is defined herein to mean that, for a plurality of virtual connections, certain values and parameters of a particular virtual connection are stored with reference to that particular virtual connection. Thus, the current values and parameters of any one of the virtual connections can be identified, retrieved and updated.

The objects are achieved by a method of the present invention having the following features:

(a) a chronological, average cell spacing of the incoming connection cells is prescribed according to an average bit rate of the virtual connection and a bit rate on the transmission link;

(b) at least one central counter is clocked by a central counting clock whose counter value is read at each of the incoming connection cells and is stored connection-associated;

(c) a counter value difference is formed from the stored counter value for the incoming connection cell and from the counter value that has been stored connection-associated for a previously arrived connection cell of the same virtual connection;

(d) a deviation of a respectively current cell spacing from the prescribed, average cell spacing is calculated for the respectively incoming connection cell on the basis of the counter value difference; and (e) a monitoring counter value is formed by a summation of the deviations of the cell spacing.

In further developments of the present invention an overflow of the central counter is stored for each of the connections on the basis of a respective, first connection-associated overflow indicator. Also, a content of the first overflow indicator is stored in a second connection-associated indicator before the storing of the overflow of the central counter.

A special handling of the connection is implemented when the monitoring counter value upwardly transgresses a first limit value. Also, the monitoring counter value is set to a second limit value when it downwardly transgresses the second limit value.

Only one central counter need be used for monitoring all virtual connections. The central counter is counted by a defined counting value in its counting clock which is matched to the respective, average cell spacings of all those connections for whose monitoring this central counter is to be employed. At least a separate overflow memory element is provided that has the overflow indicators for all connections. Following an overflow of the central counter, the special handling is not implemented in any case for a connection at the next, successively arriving connection cell of one of the virtual connections. The central counter can have a counter width greater than or equal to 24 binary places.

The present invention is based on the perception that a connection-associated monitoring counter value is only of significance at points in time whereat an incoming connection cell of a virtual connection to be monitored is present, so that this monitoring counter need not be constantly updated. Rather, only one central counter is required whose counter value is read connection-associated and stored at these points in time, so that a counter value difference of the central counter can be monitored between incoming connection cells on the basis of an anticipated, mean spacing between the incoming connection cells, and so that, for example, the monitoring counter value can be simulated by summing up these deviations. The method of the present invention can be utilized for monitoring bit rates of virtual connections.

Different, connection-associated bit rates of an extremely great number of virtual connections can be monitored in a simple way. In accordance with the use of a central counter, referred to as a master counter, this method can also be referred to as a master counter method. A method for policing is set forth for monitoring bit rates of virtual connections of, for example, an ATM network. Only a central counter is counted, that is clocked, in a central counting clock. Counter values are stored, calculated, compared and checked in the connection-associated data fields only for an incoming connection cell. A great plurality of monitorable central office lines is thereby enabled, even given higher bit rates.

By contrast to the above-recited known method based on the leaky bucket principle, the master counter method has the advantage that a great number of individual, connection-associated counters no longer need be counted per cell clock but only that the central counter, the master counter, is counted and that a monitoring counter value of a virtual connection-associated counter need only be calculated and interpreted for an incoming connection cell. The connection-associated monitoring counter in the master counter method thus need not be realized in terms of hardware but is only respectively stored monitoring counter values with which the counter value of the connection-associated monitoring counter is simulated only at the points in time.

This enormous advantage is achieved while exploiting the fact that only the counter value of the connection-associated counter is relevant for an incoming connection cell, this counter, for example, being allocated to a VCI of the connection cell that is just being received. This monitoring counter value can be calculated. A threshold and a decrementation value are required as parameters. Further, an earlier counter value of the central counter must be stored in connection-associated fashion at the arrival of the most recent, previously incoming connection cell that belongs to the appertaining VCI and, thus, to the same virtual connection. An earlier connection-associated monitoring counter value must likewise be stored at that point in time. A new connection-associated monitoring counter value can be calculated with these two values as well as with a new counter value of the central counter that is to be read at the point in time of an incoming connection cell.

For example, the central counter is counted at the central cell clock. When a connection cell arrives, the appertaining connection-associated monitoring counter value is recalculated. The leaky bucket principle can then serve as a policing function in this evaluation. The number of virtual connections that can be monitored is thereby only limited by the storage space available for noting.

The master counter method can be modified such that the central counter is counted by a defined number per cell clock. This number can be equal to one or can be greater than one in another embodiment. The connection-associated parameters can be correspondingly adapted. A higher resolution can thereby be achieved, particularly in the range of high bit rates, for example 20 through 140 Mbits/sec, so that a greater number of bit rates and traffic categories can be achieved in this range. The monitoring of the connections with an allocated central counter can likewise be implemented for a traffic category or for a group of traffic categories and the monitoring of the connections can be implemented with a further, allocated central counter for another traffic category or for another group of traffic categories. A better matching of the central counting clock and of the connection-associated parameters can thus be achieved.

Embodiments of the present invention are possible wherein the central counter is incremented, as are embodiments wherein the central counter is decremented. Alternatives are possible for the procedure for overflow of the central counter which is equivalent to underflow of the central counter. The terms overflow or upper transgression or, respectively, underflow or downward transgression generally refer to the counting direction of the respective counters.

In a preferred embodiment, the overflow of the central counter for each of the connections to be monitored can be stored with a respectively first, connection-associated overflow indication and can thus be stored and read out at a later point in time. In other preferred embodiments, a content of the first overflow indication can be stored in a second connection-associated overflow indication before the notation of the overflow of the central counter, so that a repeated overflow of the central counter can thus also be stored and read out at a later point in time.

The master counter can overflow after a finite time span that is dependent on the counter width and on the counting clock. In this case, a faulty result can occur when forming the difference between counter values. In order to enable a correct calculation, an overflow indicator should be set given an overflow of the master counter for every VCI. When forming the differences, this overflow indication can then be taken into consideration. In a preferred embodiment, this overflow indication is not a component part of a policing RAM for storing the connection-associated counters and parameters, so that all VCIs need not be individually addressed when setting the overflow indicators. A separate overflow register whose width can correspond to a maximally allowable number of VCIs, for example 2048, can be employed for the administration of the overflow indicators. All overflow indicators of this overflow register can be simultaneously set given an overflow of the master counter. The individual overflow indicators are reset in connection-associated fashion at the arrival of an incoming connection cell for the respective VCI.

When handling an incoming connection cell given a set overflow indicator of the allocated VCI, it cannot initially be determined whether the master counter overflowed once or repeatedly since the previously arrived connection cell. This can lead to errors given highly burst-like connections when no connection cells arrive over a longer time. For example, when, given an incoming connection cell of a connection, a connection-associated monitoring counter value is calculated immediately before an overflow of the central counter just below the connection-associated threshold for this connection, then a special handling should be implemented for this connection when the next-successive connection cell arrives just after the immediately following overflow of the central counter. When, however, this next-successive connection cell of this connection arrives only shortly after an impending overflow of the central counter, then no special handling should follow. For a repeated overflow of the master counter between two incoming connection cells of a connection, a longer time span has elapsed in the meantime and the implementation of a special handling should be suppressed. This problem of distinguishing between a single overflow and a repeated overflow of the central counter for triggering or suppressing a special handling can be resolved in various ways.

One solution of this problem in the monitoring is to provide a second connection-associated overflow indicator. At every overflow of the master counter, this accepts the content of the first overflow indicator directly before the first overflow indicator is set. When both overflow indicators are set at the arrival of a connection cell from a connection, then it can be recognized therefrom that at least two overflows of the master counter have occurred since the arrival of the preceding connection cell of this connection. This is then correspondingly taken into consideration in the calculation of the connection-associated monitoring counter value for this connection. For example, the monitoring counter value is set to zero or to a value provided for this purpose. Both overflow indicators are reset. No special handling of this connection thus occurs and the connection cell that just arrived is forwarded, i.e. is allowed to pass.

In another solution, a minor imprecision is frequently allowed in favor of the subscriber. In this solution, the second overflow indicator is completely foregone. After an overflow of the master counter, the next, successively arriving connection cell of a connection is allowed to pass in any case. A special handling of this connection is thus suppressed for the respective connection cell that is the first to arrive following an overflow of the master counter. Thus the connection-associated monitoring counter value remains unmodified and is not recalculated. Only the first and only overflow indicator of this connection is reset. The error in this procedure with respect to the monitoring of the bit rate is slight and depends on the counting width of the master counter. For a larger counter width, this error is smaller. This error is also smaller for a higher bit rate. For example, this error can be left out of consideration for a counter width of 24 binary places.

In a preferred embodiment of the present invention, the monitoring counter value is set to a second limit value, for example zero, when it downwardly transgresses this second limit value. A limitation of burst length can thus be achieved. On the basis thereof or, for example, also on the basis of a calculation or of a connection-associated storing of a further connection-associated monitoring counter value, a maximum bit rate of the connection can also be monitored. A further special handling can be initiated when this is upwardly transgressed, this further special handling resulting, for example, in a modification of the allocated service category for this connection and, thus, also in a modification of the calculation of the call fee.

In one application of the method of the present invention, only one central counting clock, for example, is provided wherein only one central counter is counted, the counter value thereof being used for all virtual connections to be monitored.

Upon call setup of a virtual connection, for example, a VCI is assigned to this connection. A table of connection-associated entries in the form of, for example, a respective data field exists for each of these VCIs, for example in a RAM. This, for example, contains the parameters of the connection, i.e., in particular, the threshold, the average cell spacing, as well as the monitoring counter value and the counter value of the central counter at an arrival of a connection cell that occurred most recently. The first and, often, only overflow indicator for each of these VCIs is administered, for example, in a separate overflow register that, for example, contains the overflow indicators of all VCIs.

During, for example, a call setup, the service category for the connection of a subscriber is defined and, thus, the average bit rate and the maximum bit rate are also defined. An average chronological spacing between connection cells of this connection is likewise defined in accordance with the service category for a calculation of the monitoring counter value. For example, this average spacing can be calculated from the total bit rate of the central office line, i.e. in case the connection cells arrive without any spacing, and from the average bit rate of the central office line for the reported service category.

For example, the central counting clock can be simultaneous counted with the incoming connection cells at the total bit rate. For example, only a single central counter can be used, this being respectively incremented, for example, by a counting value equal to one at every counting clock. Connections of all service categories can be monitored in this case. The average mean spacing at an average bit rate as well as the average, minimum spacing at a maximum bit rate can be simply calculated according to the following equations:

$$\text{average spacing} = \frac{\text{total bit rate}}{\text{average bit rate}}$$

$$\text{minimum spacing} = \frac{\text{total bit rate}}{\text{maximum bit rate}}$$

Given, for example, a total bit rate of 64 Mbit/sec and an average bit rate of 64 kbit/sec, produces an average, mean spacing of 1000. For this case, this means that gaps without incoming connection cells would normally follow after a connection cell that has arrived. On average, i.e. as a mean, the next incoming connection cell of this connection follows instead of the 1000$^{th}$ gap. Given a maximum bit rate of, for example, 2 Mbits/sec, an average minimum spacing of 32 results. At the maximum bit rate, gaps without incoming connection cells of this connection normally follow after a connection cell that has arrived and the next, incoming connection cell of this connection normally only follows on average, instead of the 32$^{nd}$ gap.

When what is referred to as a burst number of successive connection cells at the maximum bit rate is defined, for example, for a recognition of bursts to be monitored, then the threshold can be defined therefrom according to the following equation:

*threshold = (burst number)·(numerical burst value)*

What is thereby valid as what is referred to as the numerical burst value is that counting value by which the monitoring counter value is counted at the maximum bit rate for every incoming connection cell. The threshold should be reached no later than after a burst number of connection cells that arrived at the maximum bit rate. At every incoming connection cell, the monitoring counter value according to the average bit rate should be counted by the average spacing reduced by the current spacing which is calculated with the counter value difference of the central counter, i.e. that plurality of counting clocks of the central counter within the time span between the currently arrived connection cell and the connection cell that arrived therebefore. At the maximum bit rate, this is the minimum spacing.

The numerical burst value can thus be calculated according to the following equation:

*Numerical burst value = (average spacing) − (minimum spacing).*

In this way, the threshold can be defined as a first limit value for which upward transgression by the monitoring counter value a special handling of the respective connection should ensue.

In a preferred embodiment, for example, a central counting clock can be used that is not counted simultaneously with every incoming connection cell at the total bit rate but which is only respectively countered after a defined plurality of cell clocks. The central counter can thereby be counted by a defined numerical value, for example it can be incremented. In this case, the average spacing just like the minimum spacing is defined according to the following equations as being referred to the central counting clock taking the counting value into consideration:

$$\text{Average spacing} = \frac{\text{total bit rate}}{\text{average bit rate}} \cdot \frac{\text{counting value}}{\text{plurality of cell clocks}}$$

$$\text{minimum spacing} = \frac{\text{total bit rate}}{\text{maximum bit rate}} \cdot \frac{\text{counting value}}{\text{plurality of cell clocks}}$$

Like all calculated values, these values, for example, can be rounded off in favor of the subscriber and should be used when calculating the numerical burst value and, thus, the threshold. The monitoring counter value that is to be calculated and monitored can also then be considered as being referred to the central counting clock. This is calculated according to the following equation from the earlier monitoring counter value UZA stored in connection-associated fashion, from the earlier counter value ZZA of the central counter stored in connection-associated fashion, from the new counter value ZZN of the central counter that is currently read, and from the average spacing MA, being calculated as new monitoring counter value UZN:

*UZN = UZA + MA − (ZZN − ZZA)*

The formation of the difference between the earlier and new counter values of the central counter is defined as a counter value difference ZZD of the central counter according to the following equation:

*ZZD = ZZN − ZZA*

This counter value difference ZZD corresponds to the current spacing between the two most recently arrived connection cells. Further, a deviation ABW of this current spacing from the average spacing MA is defined according to the following equation:

*ABW = MA − ZZD*

The new monitoring counter value UZN, consequently, is defined according to the following equation as a sum formation of this deviation ABW with the earlier monitoring counter value UZA:

*UZN = UZA + ABW*

Consequently, the monitoring counter value is interpreted as being a summing-up of deviations ABW of the respective current spacing from the average spacing between the connection cells that have arrived.

In a preferred embodiment for limiting the burst length to, for example, zero the new calculated monitoring counter value UZN should be set as a second limit value in case it is calculated lower than this second limit value.

This newly calculated monitoring counter value is checked for an upward transgression of the threshold SW. Before this, however, the overflow indicator is checked and subsequently reset. For a single overflow indicator used connection-associated that had been set, for example UANZ=1, a special handling of the connection is suppressed. The monitoring counter value remains unaltered and the current counter value of the central counter remains stored.

In case UANZ=1:
UANZ=0,
UZA=UZA,
ZZA=ZZN.

The connection cell that just arrived should be forwarded.

When the overflow indicator was not set, i.e., for example, when UANZ=0, and when an upward transgression of the threshold is not established, the monitoring counter value is recalculated and remain stored and the current counter value of the central counter is stored.

In case UANZ=0 and UZN≦SW:
UZA=UZN
ZZA=ZZN

In this case, the connection cell that just arrived is forwarded.

Otherwise, a special handling occurs.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a flow chart depicting an exemplary embodiment for the implementation of the method of the present invention;

FIG. 2A-2D are flow charts depicting an exemplary embodiment for the implementation of the monitoring program of the method of the present invention;

FIG. 4 is a diagram of a chronological execution with two incoming connection cells of the same virtual connection and with an illustration of data fields of the present invention.

DESCRIPTION OF THE PREFERRED EMBODIMENT

Figure 2B:
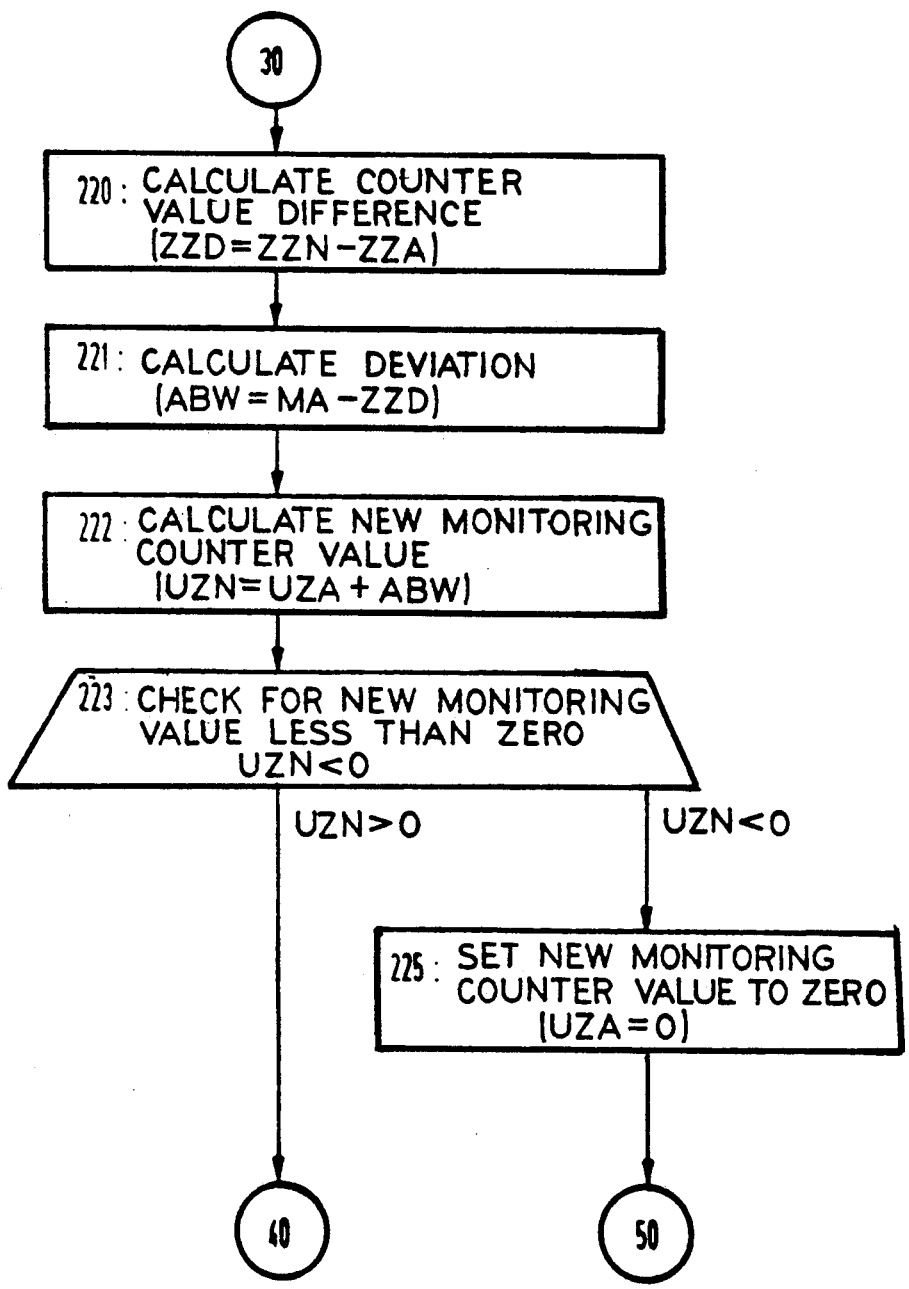

As FIG. 1 shows, a wait for the next counting clock for counting the central counter is first carried out in the method of the present invention in a control section 100.

The control section 110 follows with the counting clock. The central counter is incremented by a numerical value, for example is incremented by one. When an overflow of the central counter occurs, then control section 111 follows; otherwise, control section 120 follows. For an overflow of the central counter, all overflow indicators of, for example, an overflow register are set in control section 111 and the central counter is set with a counter value equal to zero. The control section 120 follows. A check is made to see whether further connection cells of virtual connections have arrived for which the bit rate is to be monitored. The monitoring program of the control section 130 is respectively individually executed for each of the connection cells that has arrived and has not yet been checked. When the monitoring program of the control section 130 has been implemented for all arrived connection cells, control section 100 follows and, as already set forth, a wait is carried out for the next counting clock of the central counter.

Supplementing FIG. 1 are FIGS. 2a, 2b, 2c and 2d that show an exemplary embodiment for this monitoring program of the control section 130 that is composed of a plurality of control sections 200 through 240. The correspondence of the control sections of FIG. 1 and FIGS. 2A-2D is based on program connectors 10, 20, 30, 40 and 50 indicated in these figures.

This monitoring program is begun with a control section 200 for a connection cell that has arrived and that is to be monitored with respect to the bit rate of the connection. The VCI for this connection is identified. In accordance with this VCI, the connection-associated parameters of this connection are loaded. This is followed by control section 210. A check is carried out to see whether a first and sole overflow indicator UANZ provided in connection-associated fashion is set for this connection. When this is the case, control section 211 follows; otherwise, control section 220 follows.

Control section 211 follows given a set overflow indicator UANZ. The overflow indicator UANZ is reset. The current counter value ZZN of the central counter is stored. The connection cell that has arrived is forwarded and the control section 120 follows again. Control section 220 follows when an overflow indicator UANZ is not set.

The counter value difference ZZD of the central counter is identified in that the earlier counter value ZZA is subtracted from the new counter value ZZN of the central counter according to:

$$ZZD = ZZN - ZZA.$$

This is followed by control section 221. A deviation ABW is identified in that the counter value difference ZZD is subtracted from an average cell spacing MA according to:

$$ABW = MA - ZZD.$$

This is followed by control section 222. The new monitoring counter value UZN is calculated in that the deviation ABW just identified is added to the earlier monitoring counter value UZA according to:

$$UZN = UZA + ABW.$$

This is followed by control section 223. A check is carried out to see whether the new monitoring counter value UZN that has just been calculated is less than zero. When this is the case, control section 225 follows; otherwise, control section 230 follows. When the new monitoring counter value UZN is less than zero, control section 225 follows. The new monitoring counter value UZN is set equal to zero for limiting burst length and control section 240 follows.

When the new monitoring counter value UZN is greater than or equal to zero, control section 230 follows. The new monitoring counter value UZN is checked for an upward transgression of the threshold SW according to:

$$SW - UZN.$$

When the new monitoring counter value UZN is greater than the threshold SW, i.e. when an upward transgression is present, control section 231 follows; otherwise, control section 240 follows. When an upward transgression is present, control section 231 follows and a special handling is implemented. This is followed by control section 120. When no upward transgression is present, control section 240 follows. The new monitoring counter value UZN and the counter value ZZN of the central counter are stored according to:

$$UZA = UZN,$$

$$ZZA = ZZN.$$

The connection cell that has arrived is forwarded and control section 120 follows again.

Figure 3:
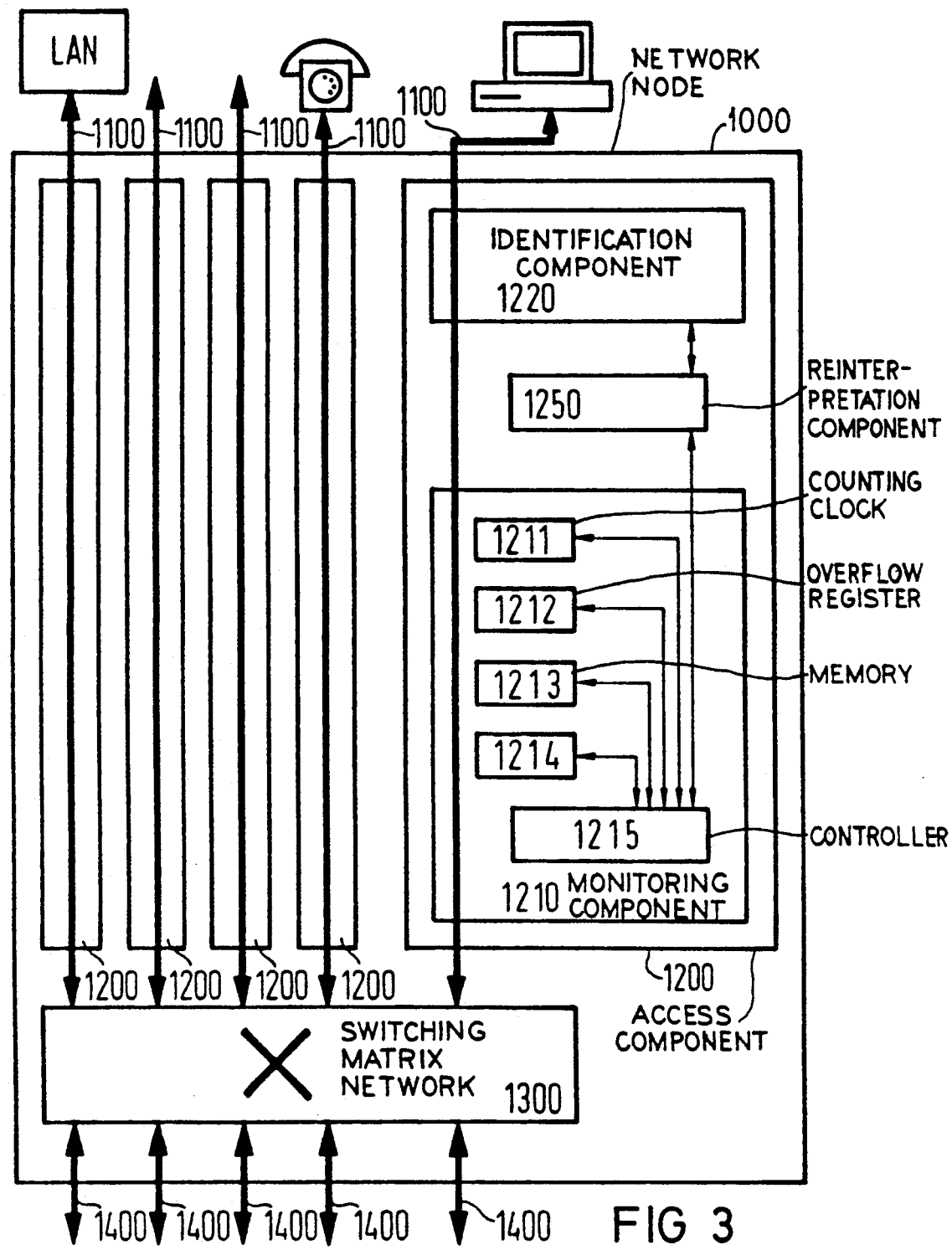
FIG. 3 is a block diagram of a network node in an ATM network for the inventive implementation of a policing function.

As FIG. 3 shows, a network node 1000 in an ATM network is composed of a plurality of central office lines 1100 as transmission links for the inventive implementation of a policing function, each and every one of these central office lines 1100 being supplied via a separate access component 1200 to a switching matrix network 1300. A respective monitoring component 1210 for the implementation of the policing function is provided in every access component 1200. Likewise, a respective identification component 1220 is provided in every access component 1200 for the identification of the individual virtual connections on the respective central office line 1100 as well as for the identification of its connection cells arriving on this transmission link that are conducted via the switching matrix network 1300 of the network node 1000 and are thus to be forwarded onto further transmission links 1400. A respective identification information of connection cells of virtual connections that are respectively set up from one of the transmission links 1100 via the switching matrix network 1300 to one of the transmission links 1400 should identify the respective virtual connection and make it individually recognizable on, first, a transmission link 1100 preceding the network node 1000 and, second, on a transmission link 1400 following the network node 1000. The respective identification information can also differ preceding the network node and following the network node For example, the conference report of the CCITT Studienkommission XVIII, June 1989, Geneva, sets forth a format for a connection cell that has 28 bits for the identification information 2048 or 4096 individual, virtual connections are simultaneously allowed on a central office line having a total bit rate of, for example, 140 Mbits/sec. The access component of this central office line, consequently, is capable of simultaneously processing 2048/4096 virtual connections and are capable of addressing these in its data fields in connection-associated fashion. Each of these 2048/4096 data fields is consequently capable of having one of the $2^{28}$ identification information allocated to it. A reinterpretation of an incoming identification information having 28 bits into an internal address having 11/12 bits that is internally used in the respective access component as an address occurs in the access component.

Given, for example, a transmission link that is down or that is overloaded, a special connection route is marked in the identification information. For example, a VPI (virtual path identifier) is contained in the 28-bit identification information in addition to a VCI (virtual channel identifier). This is observed in the access component. This has no fundamental significance for the identification of the internal VCI.

The monitoring component 1210 can also be integrated into the identification component 1220. In any case, a separate reinterpretation component 1250 can also be provided, this generating the respective, internal VCI for the connection cell that has arrived from the 28-bit identification information that arrived and was obtained from the identification component 1220, for instance with reference to a reinterpretation table, and that supplies this interval VCI to the monitoring component 1210 and to the identification component 1220.

As already set forth, a respectively separate monitoring component 1210 is provided in the respective access component 1200 for each of the transmission links 1100 in this exemplary embodiment.

Each of these monitoring components 1210 contains its own counting clock component 1211 wherein the central counting clock is generated for counting the central counter. In this exemplary embodiment, the central counter should be counted in time intervals of approximately 3 μsec. Given a total bit rate of 140 mbits/sec, this is adapted to connection cells that arrive gap-free in succession and have a cell length of a total of 53 bytes that should be transmitted on the transmission link with a clock rate of approximately 150 mbits/sec.

Each of the monitoring components 1210 likewise contains its own memory component 1213 that is used as a policing RAM. A separate data block is provided for each of the 2048 addresses, the counter value of the central counter, the monitoring counter value, the threshold and the average cell spacing for the respective VCI being stored in this data block.

The monitoring component 1210 likewise contains its own overflow register 1212 that contains an addressable overflow indicator for each of the 2048 internal VCIs that are individually read and erased. Given an overflow of the central counter, all 2048 indicators of the overflow register 1212 are set at once.

The monitoring component 1210 likewise contains its own controller component 1215 wherein the executions shown in FIGS. 1 and 2A-2D are executed. This receives the central counting clock from the counting clock module 1211. It likewise receives the internal VCI of the most recently arrived connection cell from the reinterpretation component 1250. It addresses the connection-associated data and parameter of this internal VCI in the memory module 1215 with the internal VCI. It likewise addresses the overflow indicator of this internal VCI in the overflow register 1212 with the internal VCI.

As soon as the controller component 1215 receives a central counting clock from the counting clock component 1211, the controller component 1215 accesses a counter component 1214. In this exemplary embodiment, the counter component 1214 contains a binary counting register having 24 binary places as the central counter. This is thereby incremented, i.e. counted up by one, and read. When an overflow of the central counter is thereby identified, the controller component 1215 accesses the overflow register 1212 and sets all 2048 indicators there at once. Subsequently, the controller component 1215 checks to see whether the reinterpretation component 1250 indicates an arrived connection cell. When this is the case, the internal VCI is received from the reinterpretation component 1250 and the monitoring program is implemented for this VCI, as particularly set forth with reference to FIGS. 2A-2D. In case the special handling is required, the cell is thereby discarded.

As FIG. 4 shows, the chronological execution for two incoming connections cells VZ1, VZ2 of the same virtual connection is shown along a time axis on which central counting clocks ZZT for the central counter are marked. Upon arrival of the first connection cell VZ1, the value ZZN=100 is obtained in this exemplary embodiment as new counter value ZZN of the central counter. Its overflow indicator UANZ is read for the internal VCI of this connection. This, for example, is set and the overflow indicator is erased. The connection-associated data are addressed with the internal VCI. The new counter value ZZN of the central counter is merely stored as old counter value for a successively arriving connection cell VZ2. The old monitoring counter value UZA is not modified and remains stored until the successively arriving connection cell VZ2 of this virtual connection.

After another 100 counting clocks ZZT, the value ZZN=200 is obtained as the new counter value ZZN of the central counter upon arrival of the next connection cell VZ2 of this virtual connection. Its overflow indicator UANZ is read for the internal VCI of this connection. This is now not set. The connection-associated data are addressed with the internal VCI. A new monitoring counter value UZN is calculated, as already set forth, according to the equation:

$$UZN = UZA + MA - ZZN + ZZA =$$
$$= 6600 + 350 - 200 + 100 =$$
$$= 6850.$$

A check is carried out to see whether the new monitoring counter value UZN is higher than the threshold SW=8000. This is not the case. Consequently, the new monitoring counter value UZN is stored as old monitoring counter value UZA for a further, successively arriving connection cell VZ2. Likewise, the new counter value ZZN of the central counter is stored as old counter value ZZA of the central counter for the further, successively arriving connection cell VZ2.

In this exemplary embodiment, an average bit rate for this virtual connection is monitored in this way. The average spacing MA=350 and the threshold SW=8000 are used as parameters. The average spacing MA=350 prescribes the bit rate to be monitored that, proceeding from a total bit rate of 140 Mbits/sec is defined, according to a division by 350, with a value of 400 kbits/sec for the prescribed, average bit rate to be monitored. As already set forth, this is monitored on the basis of the monitoring counter value which can be viewed as a summing up of all deviations from the average bit rate and that is recalculated at every arriving connection cell in that the deviation in the spacing between the two most recently arrived connection cells is added. This deviation can be positive, as shown by way of example in FIG. 4, and thereby increment the monitoring counter value when the spacing between the two most recently arrived connection cells is shorter than the prescribed, average spacing, or can be negative when the spacing is greater than the prescribed, average spacing.

Given, for example, a spacing of 9000 counting clocks ZZT between two arrived connection cells, i.e. a counter value difference of:

$$ZZD = ZZN - ZZA = 900$$

for the respective counter value of the central counter given the two connection cells that have respectively arrived, a deviation results as follows:

$$ABW = MA - ZZN + ZZA =$$
$$= MA - ZZD =$$
$$= 350 - 9000 =$$
$$= 8650$$

and a new monitoring counter value is calculated according to:

$$UZN = UZA = MA - ZZN + ZZA =$$
$$= UZA + MA - ZZD =$$
$$= UZA + ABW =$$
$$= UZA - 8650.$$

Assuming that the old monitoring counter value UZA is lower than the threshold SW=8000, then the new monitoring counter value receives a negative value.

This should not be allowed in order to make a limitation of burst length stricter. If the monitoring counter value were to downwardly transgress a limit value, the value zero in this exemplary embodiment, then it should be set to this limit value. In this exemplary embodiment, the monitoring counter value is set equal to zero in this case.

$$UZA = UZN = 0.$$

When, for example, 23 connections cells of this same virtual connection now arrive in immediate succession, i.e. each at the respectively next counting clock ZZT, then the counter value difference ZZD of the central counter amounts to one every time according to:

$$ZZD = ZZN - ZZA = 1,$$

and the deviation ABW, consequently, each time amounts to:

$$ABW = MA = ZZN + ZZA =$$
$$= MA - ZZD =$$
$$= 350 - 1 =$$
$$= 349$$

and the monitoring counter value is incremented by the value of the deviation ABW=349 every time at the arrival of the connection cells arriving in immediate succession according to:

$$UZN = UZA + MA - ZZN + ZZA =$$
$$= UZA + MA - ZZD =$$
$$= UZA + ABW =$$
$$= UZA + 349$$

Proceeding from an old monitoring counter value UZA=0 at the first of these connection cells arriving in immediate succession, the new monitoring counter value UZN receives the value 23 times 349 according to:

$$UZN = 0 + 23 \text{ times } 349 = 8027$$

at the 23$^{rd}$ connection cell of the connection cells that arrive in immediate succession. It turns out that this value of the new monitoring counter value UZN is now higher than the threshold SW = 8000. The special handling is now to be implemented for this virtual connection. In this exemplary embodiment, the virtual connection is aborted as special handling.

In this case, there is a burst having a maximum bit rate of 140 Mbits/sec. According to a prescribed, average bit rate of 400 kbit/sec, a 350-fold upward transgression of the average bit rate is present and this virtual connection is aborted no later than after a burst plurality of 23 connection cells having a burst value of 349. Given a counting clock ZZT of respectively approximately 3 μsec, an abort will be carried out in this case no later than approximately 70 μsec.

Considering another case wherein, proceeding from a monitoring counter value equal to zero, at least 8000 connection cells successively arrive, each respectively having a constant spacing of 349 counting clocks, then the respective value 349 will thereby be obtained as counter value difference ZZD of the central counter according to:

$$ZZD = ZZN - ZZA = 349$$

and, consequently, the deviation ABW each time amounts to:

$$ABW = MA - ZZD = 350 - 349 = 1.$$

The monitoring counter value will be incremented by the value of the deviation ABW = 1 each time given the arrival of one of the connection cells always respectively arriving after 349 counting clocks ZZT, according to:

$$UZN = UZA + ABW = UZA + 1.$$

Proceeding from an old monitoring counter value UZA = 0 at the first of these connection cells respectively arriving at the spacing of 349 counting clocks ZZT, the new monitoring counter value UZN receives the value 8001 at the 8001$^{st}$ connection cell to arrive according to:

$$UZN = 0 + 1 \text{ times } 8001 = 8001.$$

It turns out that this value of the new monitoring counter value UZN is now higher than the threshold SW = 8000. The special handling is now to be implemented for this virtual connection. This virtual connection is now to be aborted.

In this case, there is a lasting, slight upward transgression of the prescribed, average bit rate of 400 kbits/sec. In this case, the upward transgression amounts to less than 0.3%. This upward transgression is not allowed over the long term and this virtual connection will be interrupted now later than after a time span of 349 times 8001 times 3 μsec, i.e. after approximately 8.4 seconds.

If the central counter has an overflow that, given a 24-bit counting register, respectively appears after 16,777,216 counting clocks ZZT, then the abort of the virtual connection in this most recent exemplary case only occurs after 8002 arrived connection cells of this virtual connection. Thus there is only a slight imprecision of approximately 0.01% in favor of the subscriber. In the preceding exemplary case of the 350-fold burst, the abort of the connection given an overflow of the central counter occurring in the meantime occurs only after 24 connection cells have arrived. The imprecision in favor of the subscriber is approximately 4%. This imprecision, however, only occurs with a probability of approximately 0.000000006. Bit rates of virtual connections can be monitored in this way.

Abbreviations and reference characters that have been used in conjunction with the figures and in the specification are defined in the following table:

ATM: asynchronous transfer modes
LAN: local area network
RAM: random access memory
VCI: virtual channel identifier for a connection
UZA: old monitoring counter value for a connection
UZN: new monitoring counter value for a connection
VZ1, VZ2: connection cell
ZZT: central counting clock
ZZA: old counter value of the central counter for a connection
ZZA: new counter value of the central counter for a connection
ZZD: counter value difference of the central counter for a connection
MA: average spacing of two connection cells of a connection
ABW: deviation of the current spacing from the average spacing of two connection cells
UANZ: overflow indicator for a connection
SW: threshold for a connection
10, 20, 30, 40,, 50: program connectors
100 . . . 240: control sections
1000: network node
1100, 1400: central office line, transmission link
1200: access component
1210: monitoring component
1211: counting clock component
1212: overflow register
1213: memory component, policing RAM
1214: counter component
1215: controller component
1220: identification component
1250: reinterpretation component
1300: switching matrix network The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for monitoring at least one bit rate of at least one virtual connection, of a plurality of virtual connections, for which connection cells incoming on a transmission link are checked with respect to their temporal frequency, comprising the steps of:

(a) providing a temporal, average cell spacing of the incoming connection cells according to an average bit rate of the at least one virtual connection and a bit rate on the transmission link;

(b) clocking a central counter by a central counting clock and reading a counter value of the central counter at each of the incoming connection cells and storing the counter value that is connection-associated with the at least one virtual connection;

(c) forming a counter value difference from the stored counter value for the incoming connection cell and from the counter value that has been previously stored connection-associated with the at least one virtual connection for a previously arrived connection cell of the same virtual connection;

(d) calculating a deviation of a respectively current cell spacing form the prescribed, average cell spacing for the respectively incoming connection cell using the counter value difference;

(e) forming a monitoring counter value by summing the deviations of the cell spacing; and (f) implementing a special handling subroutine for the virtual connection when the monitoring counter value transgresses a first threshold value to thereby modify the at least one virtual connection relative to respective incoming connection cells.

2. The method according to claim 1, wherein an overflow of the central counter is stored for each of the connections using a respective, first overflow indicator.

3. The method according to claim 2, wherein a content of the respective first overflow indicator is stored in a respective second indicator before the storing of the overflow of the central counter.

4. The method according to claim 1, wherein the special handling of the connection is implemented when the monitoring counter value upwardly transgresses the first threshold value.

5. The method according to claim 1, wherein the monitoring counter value is set to a second threshold value when it downwardly transgresses the second threshold value.

6. The method according to claim 1, wherein only one central counter is used for monitoring all virtual connections.

7. The method according to claim 1, wherein average cell spacings of all virtual connections are derived form a total bit rate of the transmission link and wherein the central counter is clocked by a defined counting value of the central counting clock which is matched to the respective, average cell spacings of all virtual connections to be monitored by use of the central counter.

8. The method according to claim 2, wherein at least a separate overflow memory element is provided that has overflow indicators for all virtual connections.

9. The method according to claim 1, wherein following an overflow of the central counter, a special handling subroutine is not implemented in any case for a virtual connection at the next, successively arriving connection cell at one of the virtual connections.

10. The method according to claim 9, wherein a central counter is provided having a counter width greater than or equal to 24 binary places.

11. A method for monitoring at least one bit rate of at least one virtual connection, of a plurality of virtual connections, for which connection cells incoming on a transmission link are checked with respect to their temporal frequency, comprising the steps of:

(a) upon arrival of an incoming connection cell at a virtual connection of the plurality of virtual connections, providing at least previously stored average cell spacing, a previous monitoring counter value and a previous counter value of a central counter, the previous counter value being related to a previous last arrived incoming connection cell at the virtual connection;

(b) clocking a central counter by a central counting clock and reading a current counter value of the central counter at each of the incoming connection cells and storing the counter value that is connection-associated wit the virtual connection, and, if the counter value overflows, storing the current counter value as the previous counter value, and going to step (a);

(c) calculating a counter value difference by subtracting the previous counter value from the stored current counter value for the incoming connection cell;

(d) calculating a deviation by subtracting the counter value difference form the average cell spacing;

(e) calculating a new monitoring counter value by adding the deviations to the previous monitoring counter value; and (f) implementing a special handling subroutine for the incoming connection cell when the new monitoring counter value transgresses a first threshold value to thereby modify the at least one virtual connection relative to respective incoming connection cells.

12. The method according to claim 11, wherein step (f) of the method further comprises the steps of:

(f1) checking if the new monitoring counter value is less than the second threshold value, and, when the new monitoring counter value is less than the second threshold value, setting the new monitoring counter value equal to the second threshold value and going to step (f3), and, when the new monitoring counter value is greater than or equal to the second threshold value going to step (f2);

(f2) checking the new monitoring counter value for an upward transgression of the first threshold value, and, when the first threshold value is transgressed by the new monitoring counter value, implementing a special handling of the incoming connection cell, and going to step (f4), and, when the first threshold value is not transgressed by the new monitoring counter value going to step (f3);

(f3) storing the current counter value and the new monitoring current value as the previous counter value and previous monitoring value, respectively, and returning to step (a); and (f4) returning to step (a).

13. The method according to claim 11, wherein an overflow of the central counter is stored for each of the virtual connections as a respective, first overflow indicator.

14. The method according to claim 13, wherein a content of the respective first overflow indicator is stored in a respective second indicator before the storing of the overflow of the central counter.

15. The method according to claim 11, wherein only one central counter is used for monitoring all virtual connections.

16. The method according to claim 11, wherein the average cell spacing is derived from a total bit rate of the transmission link and wherein the central counter is clocked by a defined counting value of the central counting clock which is matched to the respective, average cell spacing of all virtual connections to be monitored by use of the central counter.

17. The method according to claim 13, wherein at least a separate overflow memory element is provided that has overflow indicators for all virtual connections.

* * * * *